United States Patent [19]

Smith

[11] E Patent Number: Re. 32,936

[45] Reissued Date of Patent: May 30, 1989

[54] ADJUSTABLE MOLD FOR CONCRETE MEDIAN BARRIER

[75] Inventor: Peter J. Smith, Gansevoort, N.Y.

[73] Assignee: Fomico International, Inc., Fort Edward, N.Y.

[21] Appl. No.: 212,291

[22] Filed: Jun. 27, 1988

Related U.S. Patent Documents

Reissue of:

[64] Patent No.: 4,668,462
Issued: May 26, 1987
Appl. No.: 820,449
Filed: Jan. 17, 1986

[51] Int. Cl.[4] ..... B28B 7/02

[52] U.S. Cl. ..... 264/320; 249/82; 249/99; 249/157; 249/158; 425/63

[58] Field of Search ..... 249/50, 82, 98, 99, 249/155-159; 264/320, 325; 404/105; 425/62-64

[56] References Cited

U.S. PATENT DOCUMENTS

| | | | |
|---|---|---|---|
| 955,282 | 4/1910 | Pocock | 249/158 |
| 1,214,870 | 2/1917 | Zeiser | 249/5 |
| 1,473,965 | 11/1923 | Moore | 249/49 |
| 1,586,352 | 5/1926 | Cochran | 249/104 |
| 1,644,584 | 10/1927 | Heltzel | 249/157 X |
| 1,644,586 | 10/1927 | Heltzel | 249/155 X |
| 1,644,587 | 10/1927 | Heltzel | 249/5 |
| 2,428,658 | 10/1947 | Falk et al. | 249/82 |
| 2,610,381 | 9/1952 | Rosati et al. | 249/155 |
| 3,071,833 | 1/1963 | Tumey | 249/155 |
| 3,071,835 | 1/1963 | Tumey | 249/155 X |
| 3,132,403 | 5/1964 | Richards et al. | 249/158 X |
| 3,281,110 | 10/1966 | Lister | 249/155 X |
| 3,472,477 | 10/1969 | Juhl | 425/63 X |
| 3,704,852 | 12/1972 | Wellander | 249/50 |
| 3,743,232 | 7/1973 | Vaughan | 425/62 X |
| 3,792,133 | 2/1974 | Goughnour | 264/33 |
| 3,813,076 | 5/1974 | Draughon et al. | 249/99 X |
| 3,957,405 | 5/1976 | Goughnour | 425/64 X |
| 4,014,633 | 3/1977 | Goughnour | 425/63 |
| 4,266,917 | 5/1981 | Godbersen | 425/64 |

*Primary Examiner*—Robert Spitzer
*Attorney, Agent, or Firm*—Kenyon & Kenyon

[57] ABSTRACT

An adjustable mold for casting asymmetric concrete highway divider sections includes a fixed sidewall, a movable sidewall, and two end walls. Each of the end walls is divided vertically into a first fixed panel and a second adjustable panel. The old can be set up to produce a barrier section that accommodates any difference in grade levels between the separated roadway lanes, within a preselected range, by adjusting the height of each second end panel relative to the adjacent first end panel and by adjusting the height of the movable sidewall to match the second end panels. All adjustments are made by means of simple jack screws. The end walls and the movable sidewall are mounted on hinged frames that can be swung open to facilitate removing a section casting from the mold.

14 Claims, 10 Drawing Sheets

134
93
92
85
86
87
88
89
91
42
23
38
84
98
25
35
133
50
47
59
97
34
48
52
62
40
46
65
58
78
33
49
61
41
63
45
53
94
96
32
95
31
24
37
39
29
55
43
44
59
74
79
22
73
80
30
54
51
56
21
26
57
28
26

135
136
85
64
65
66
67
E
101
109
38
83
D
76
75
98
50
71
47
74
59
73
35
97
48
52
34
116
124
46
110
78
39
33
45
94
106
F
49
32
31
95
96
44
115
60
79
127
58
54
51
137
30
43
37
107
56
27
106
57
112
108

ADJUSTABLE MOLD FOR CONCRETE MEDIAN BARRIER

Matter enclosed in heavy brackets [ ] appears in the original patent but forms no part of this reissue specification; matter printed in italics indicates the additions made by reissue.

BACKGROUND OF THE INVENTION

The present invention relates to a mold for casting a concrete median barrier, and particularly to a mold which can be adjusted to produce selectively different asymmetrical barrier sections conforming to different grade levels of two adjacent roadway lanes.

Modern highway concrete median barriers have a specified profile that has been scientifically developed to receive and contain a travelling vehicle that strikes the barrier, to avoid reflecting the vehicle into adjacent lanes of traffic. As shown in FIGS. 1-3, a barrier 1 of this type has a profile that includes at least one upwardly inward sloping face with two slopes 3, 4, connecting a lower vertical surface 5 and an upper vertical surface 6. The sloping face intersects the lower vertical surface at a level which must be approximately three inches above the surface of an adjacent roadway lane 7 (FIG. 1). Normally, such barriers are symmetrical, having identical profiles on opposite sides, as shown in FIG. 2, resulting in a stable barrier in which the width of the base 9 is several times greater than the width of the top 10. In situations where the roadway lanes 7, 8 on each side of the barrier are at different levels, however, the barrier must be asymmetric with respect to the vertical center plane of the barrier, so that the sloping portions on the two sides commence at the required three inch height above the respective lane surfaces, as shown in FIGS. 1 and 3 where the corresponding portions of the shifted side are identified by the same numerals with a prime. Since the difference in grade between the lanes may vary over the standard 20-foot length of a barrier section, one side profile often must be skewed as well as translated in a vertical plane with respect to the other side profile.

Although it is standard practice to prefabricate standard symmetric median barrier sections under factory controlled conditions, asymmetric barrier sections have had to be cast at the job site in molds specifically set up for each secton. This procedure is expensive and slow; it interferes with other work on the job; and it does not result in the quality of product obtainable at a factory location.

A method and mobile apparatus have been developed (see U.S. Pat. Nos. 3,792,133 and 4,014,633 of Goughnour) for continuously slip casting asymmetrical median barrier walls directly in place on a highway under construction. The apparatus includes a screed having two sidewalls, at least one of the sidewalls being vertically adjustable relative to the other to accommodate variations in grade level of the roadways on the opposite sides of the barrier. This system eliminates the labor needed to set up and take down formwork for successive barrier sections, but the procedure requires close coordination of several different crews preparing the roadbed, setting the reinforcing steel, moving and adjusting the form, and pouring and settling the concrete. The concrete mix used in this process must by "dry" enough to be accurately extruded from the mold but must also be wet enough to be extruded and wet enough to retain entrained air in the mixture (for durability). Such an optimum mixture is difficult to obtain consistently under job site conditions. In addition, the quality of the concrete mix used at a job site cannot be controlled as closely as is possible at a factory site.

Various types of adjustable forms for concrete structures are known, for example for U.S. Pat. Nos. 1,644,587 of Heltzel, 3,071,833 of Tumey, 1,214,870 of Zeiser, 2,610,381 of Rosati et al., 3,704,852 of Wellander, 1,743,965 of Moore, 955,282 of Pocock, and 1,586,352 of Cochran. Each of these prior art mold apparatuses is adapted to solve a specific molding problem, and only the form of Tumey is specifically intended for use in prefabricating a concrete member, as opposed to on-site fabrication. None of them solves the problems involved in providing a reusable, fully adjustable mold for prefabricating asymmetric mediam barriers.

SUMMARY OF THE INVENTION

The object of the present invention is to provide a reusable adjustable mold apparatus for casting concrete highway median barrier sections, the mold being capable of producing standard length barrier sections, either symmetric or asymmetric, within the full range of vertical differences encountered in practice between roadway grades on the two sides of the barrier.

A further object of the invention is to provide an adjustable mold for highway median barrier section that is easy and quick to set up.

Another object of the invention is to provide an adjustable mold that permits rapid extraction of a cured concrete barrier section.

Another object of the invention is to provide an adjustable mold that is rigid enough to maintain close dimensional tolerances for the finished product.

Still another object of the invention is to provide a fully adjustable mold for concrete median barrier sections that provides a product of superior quality that requires little or no further finishing after extraction from the mold.

The above and other objects are provided by a reusable adjustable mold for highway median barrier sections capable of accommodating a continuously variable vertical difference of up to two feet between the two side profiles and from end to end of a standard 20-foot barrier section.

The mold includes first and second elongated side walls, an elongated rectangular base wall, and first and second end closures. The first side wall is fixed in a level and upright position, and one longitudinal edge of the base wall is fixedly attached adjacent to the bottom edge of the first side wall. The second side wall is slidably supported on vertical rails of an upright side framework that is pivotally mounted to swing (about a horizontal axis that is parallel to the longitudinal axis of the mold) toward and away from the first side wall. This brings the inner surface of the second side wall into and out of contact with the other longitudinal edge of the base wall to close and open the mold.

The height and longitudinal slope of the second side wall can be adjusted on the vertical rails of the framework by jack screws or other suitable means. In this way, one side face of the resulting cast concrete barrier can be oriented relative to the other side face to conform to any misalignment in level and slope between the two adjacent roadways within a predetermined maximum vertical range.

One of the principal inventive features of the adjustable mold of the present invention is the design of the end closures. If the second side wall must be adjusted to a non-horizontal position, the end edges of the second side wall will not be coplanar with the end edges of the first side wall. This misalignment presents a difficult closure problem, particularly since the degree of misalignment can differ from section to section.

The solution has been to provide an end closure that is split at the vertical center plane of the mold. A first half end plate is fixedly mounted on an upright end framework that is pivotally mounted to swing toward and away from a respective end of the mold into and out of sealing contact with the ends of the first side wall and the base wall. A second half end plate is supported on the end framework by suitable means such as a jack screw to permit adjustable vertical sliding movement of the second half end plate in contact with the first end plate and with the inside vertical surfaces of the second side wall of the mold until the sloping surfaces of the second side wall are sealed by mating surfaces on the second half end plate.

DETAILED DESCRIPTION OF THE PREFERRED EMBODIMENTS

Figure 1:
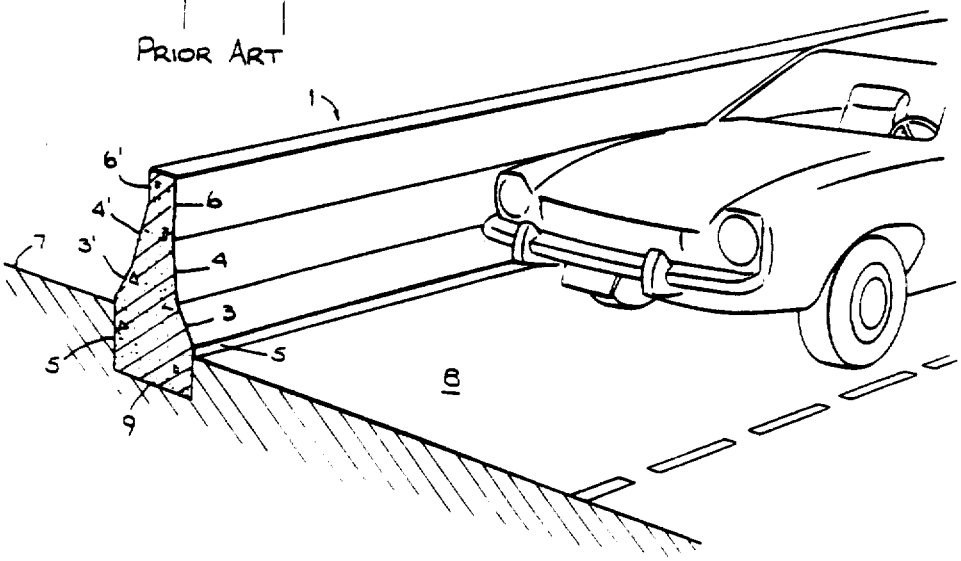
Fig. 1. PRIOR ART
FIG. 1 is a perspective view, in section, of a highway having a conventional asymmetric median barrier arranged between two lanes at different grade levels.

With reference initially to FIGS. 4–9, an adjustable mold apparatus 20 for casting an elongated concrete barrier section consists generally of a rectangular base frame 21 upon which is mounted a fixed support structure 22 for a stationary side portion 23 of the mold and a movable support structure 24 for an adjustable side portion 25 of the mold.

The base frame 21 is a lattice-like welded assembly of steel channels forming outer side members 26, outer end members 27, and spaced intermediate pairs of cross members 28. The fixed support structure 22 includes an inverted channel beam 29 carried on upright members 30 and extending longitudinally above the base frame as an elongated horizontal pedestal to which is attached a bottom plate 31 of the stationary side portion of the mold (see FIGS. 7 and 9). The remainder of the stationary portion of the mold includes an elongated rectangular steel plate, comprised of surfaces 31, 32, 33, 34, and 35, which is bent to the configuration shown to form a first profiled side wall 36 of the mold. This first side wall 36 is rigidly supported by the remainder of the fixed support structure, which includes an upright welded frame of vertical box-section end studs 37 (see FIG. 9) welded at their lower ends to the cross members of the base frame and at their upper ends to a longitudinally extending box beam top header 38. Between the end studs, spaced transverse rib plates 39 are welded to the stationary side wall plate and to the header beam 38 to create a rigid supporting structure that prevents the side walls from deflecting under the pressure of concrete poured into the mold.

A catwalk 40 supported by joists 41 welded to the rib plates 39 and enclosed by a guard rail 42 supported on stanchions 43 provides access for workmen to the top of the mold.

The movable portion of the mold similarly includes elongated rectangular steel surfaces, 44, 45, 46, and 47, formed by bending a single elongated plate to form a second profiled side wall 48 of the mold. Longitudinally spaced vertical rib plates 49 welded top and bottom to horizontal box beams 50 and 51, respectively, provide a stiff grid-like backing for the plates of the movable side wall of the mold. Three vertically spaced longitudinally extending horizontal beams 52, 53, and 54 (see FIG. 9) are welded to notches in the outside edge 55 of each rib plate. These beams stiffen the movable side wall structure and also serve as elements for connecting the second side wall to longitudinally spaced upright support posts 56.

Figure 9:
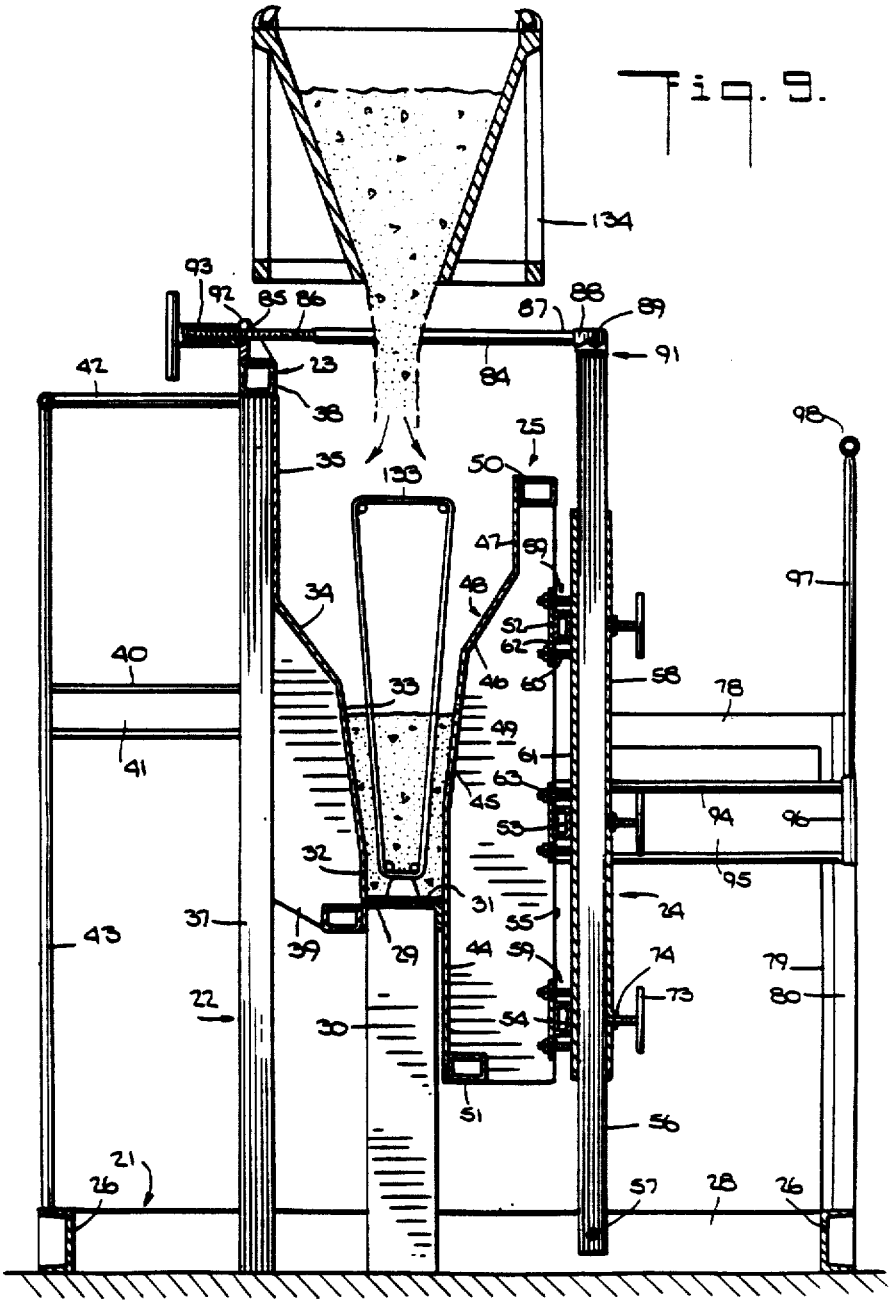
FIG. 9 is a cross section view in elevation of the mold apparatus of FIG. 4, taken along the line 9—9 of FIG. 6 and showing the pouring of an asymmetric concrete barrier.

Each support post 56 is mounted between a corresponding pair of cross members 28 on a bolt 57 which serves as a pivot pin for limited rotation in a vertical plane perpendicular to the longitudinal axis of the mold (see FIG. 9). A sleeve 58 loosely telescoped over each support post 56 is fastened to each of the three horizontal beams 52, 53, and 54 by clamping means 59 such as pairs of studs 60 welded to the inner face 61 of the sleeve 58 above and below each horizontal beam and carrying straps 62 that press the corresponding horizontal beam against the inner face of the sleeve by means of nuts 63. The studs 60 of each pair are spaced apart by more than the vertical dimension of the corresponding horizontal beam to permit a small amount of angular displacement (on the order of 10 degrees) between the sleeve and the horizontal beams to which it is clamped.

The height of the second side wall 48 of the mold can be adjusted by screw jacks 64 located at each end of the mold structure (see FIGS. 5–8). Each screw jack 64 includes a long T-handled screw 65 supported by a first nu 66 welded to the screw or otherwise fixed against rotation with respect to the screw, and bearing on a top plate 67 of a first bracket 68 that is welded to a side face 69 near the top of an endmost one of the support posts 56. The screw extends loosely through a hold in the top plate 67 downward through a corresponding hole in a top plate of a second bracket 71 welded to a side face near the upper end of the corresponding sleeve 58. The screw is threaded through a second nut 72 that is welded to or otherwise anchored against rotation with respect to the under surface of the top plate 70 of the second bracket. By this arrangement, rotation of the jack screw 65 by its T-handle, clockwise or counterclockwise, will respectively raise or lower the corresponding sleeve 58 on its end support post 56.

Figure 6:
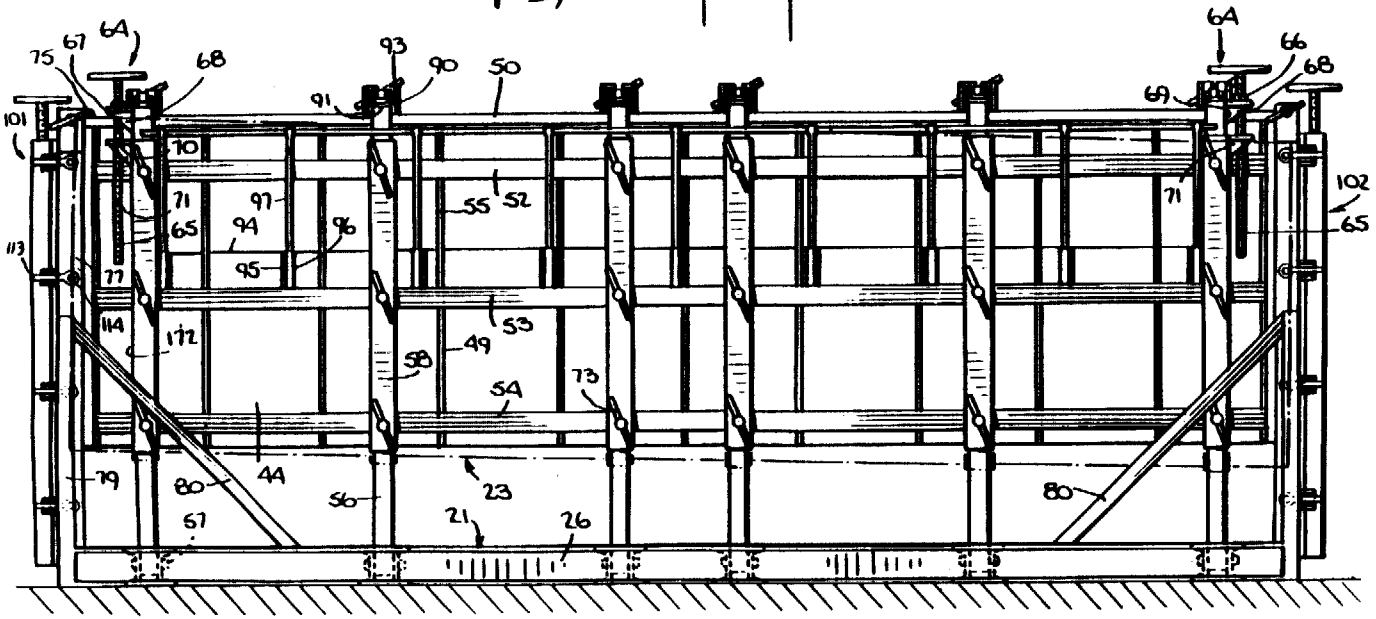
FIG. 6 is a side elevation view of the adjustable mold apparatus of FIG. 4.

Rotation of the jack screw 65 at one end of the mold structure can be coordinated with the rotation of the corresponding jack screw at the other end to maintain the second side of the mold level (as shown by the solid lines in FIG. 6). Or the number of turns for each jack screw may be different, so that the second side of the mold becomes tilted from one end to the other (as shown by the dash-dot lines in FIG. 6). As described above, the clamping means for attaching the horizontal beams of the second side of the mold to the sleeves 58 permits the necessary angular adjustment to occur between the beams 52, 53, and 54 and the sleeves 58 if the side wall is tilted longitudinally.

As shown clearly in FIGS. 4, 5, 6, and 9, each sleeve 58 can be releasably locked at any height to its respective support post 56 by three T-handled clamping screws 73 that are threaded into nuts 74 welded to an outer side wall of the sleeve in line with holes in the sleeve wall to permit the inner end of the clamping screw to bear against the adjacent side wall of the corresponding support post 56.

Figure 12:
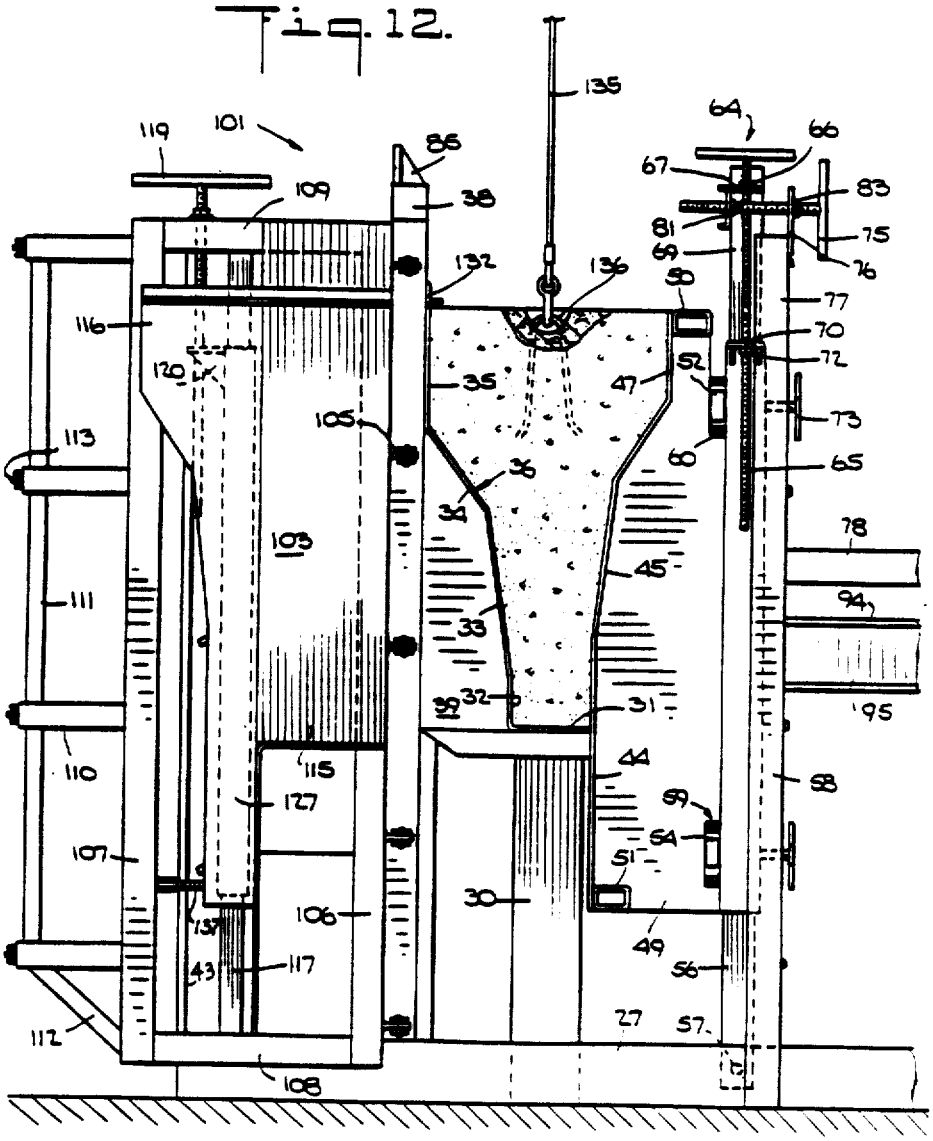
FIG. 12 is an end elevation view of the mold apparatus of FIG. 4 showing the end door open and a cable attached to a cured concrete barrier ready to lift the barrier from the mold.

In addition, the adjustable second side of the mold can be tilted laterally away from the stationary first side by means of two T-handled lateral adjustment screws 75, located one at each end of the movable side of the mold structure. Each lateral adjustment screw 75 is inserted loosely through a hole in a flat plate 76 welded to the outer face of one of two stationary end posts 77. Each end post 77 has a lower end welded to the corresponding transverse end member 27 of the base frame 21 and is rigidly supported by a lateral brace 78 welded to a respective upright corner post 79 that is stiffened by an inclined prop 80. Each lateral adjustment screw is threaded into a first nut 81 that is welded or otherwise fixed to a bracket 82 made from a short length of steel channel. Each bracket 82 is welded or otherwise fastened to the upper end of the corresponding endmost pivotable support post 56. A second nut 82 is fixed to the lateral adjustment screw and bears against the outer face of plate 76, so that clockwise rotation of the T-handle will draw the movable side of the mold away from the fixed side. This action is shown most clearly in FIGS. 12 and 13, which will be described in further detail below in connection with the operation of the mold.

Conversely, tie rods 84 (see particularly FIG. 9) are used to draw and hold the adjustable second side of the mold tightly against the stationary first side. A tie rod 84 is provided between the top of each pivoted support post 56 and a corresponding bracket 85 welded to the top header 38 of the fixed support structure for the stationary wall. Each tie rod 84 has a screw-threaded first end 86 and a second end 87 provided with a hook 88 that engages a bolt or pin 89 extending between two side plates 90 of a U-shaped support member 91 welded to the upper end of the corresponding support post 56. The screw-threaded first end 86 of each tie rod rests in a slot 92 (FIG. 9) provided in the bracket 85. A tubular T-handled nut 93 is screwed onto the first end of the tie rod to bear against the bracket.

The movable side of the mold structure also has a catwalk 94 supported on joints 95 that have inner ends welded to respective ones of the rib plates 49. The outer ends of the joists carry cylindrical sockets 96 into which are inserted stanchions 97 that support a guard rail 98. This second catwalk 94 provides access to the adjustable side of the mold and is at a convenient height to allow easy operation of screw jacks 64 and lateral adjustment screws 75 as well as easy access for finishing the top of the concrete surface.

As mentioned earlier, an important feature of the present invention is the arrangement for providing an adjustable closure for each end of the mold. With reference particularly to FIGS. 4–8, first and second end closures 101 and 102 (FIG. 5) are provided, one at each end of the mold. End closure 102 is essentially a mirror image of end closure 101; so only the first end closure 101 will be described in detail.

Because the adjustable second wall of the mold can be tilted longitudinally as well as translated vertically, with respect to the stationary first wall, it is not possible to close the ends of the mold with a flat plate butted against the end edges of the two walls of the mold. As shown in FIG. 6, if the second wall is tilted, the end edges of the second wall (dot-dash lines) are no longer plumb and coplanar with the corresponding end edges of the first wall. Since each end of the second side wall of the mold also can be shifted vertically with respect to the adjacent end of the first side wall of the mold, it also is not possible to fit an end closure plate between the walls because the profiled contours of the two side walls are infinitely changeable with respect to each other.

The design of end closure 101 solves this problem by providing a closure panel 103 in two sections carried by a door frame 104 that is swingably mounted on hinges 105 fastened to one of the box-section end studs 37 of the fixed support structure for the first side wall. The door frame is a welded assembly of two vertical box members 106 and 107 joined by an upper box rail 109. The door is extended laterally from box member 107 by four cantilevered stub beams 110 supported at their free ends by a vertical member 111 and a strut 112. The free end of each stub beam is fitted with a hinged eye latch 113 that engages a mating pin 114 on the adjacent stationary end post 77 to hold the door in the shut position.

A first rectangular end panel section 115 is fixedly attached to the door frame 104 adjacent to the hinges 105. A second end panel section 116 abutting the first panel section is supported from the frame by means for providing vertical movement with respect to the first panel section. The support means for the second panel section includes a vertical box-section post 117 extending between the lower and upper rails 108 and 109. A sleeve member 118 is slidably mounted on post 117 and is fixed to the second panel section 116.

A T-handled jack screw 119 connecting the upper rail 109 to a bracket 120 fastened to the upper end of sleeve 118 provides vertical adjustment of the second panel section with respect to the door frame (and thus with respect to the first panel section) in the same manner as the jack screws 65 provide vertical adjustment for the second side wall 48 of the mold. After adjustment, the sleeve 118 can be locked to post 117 by three T-handled clamping screws 121.

Figure 5:
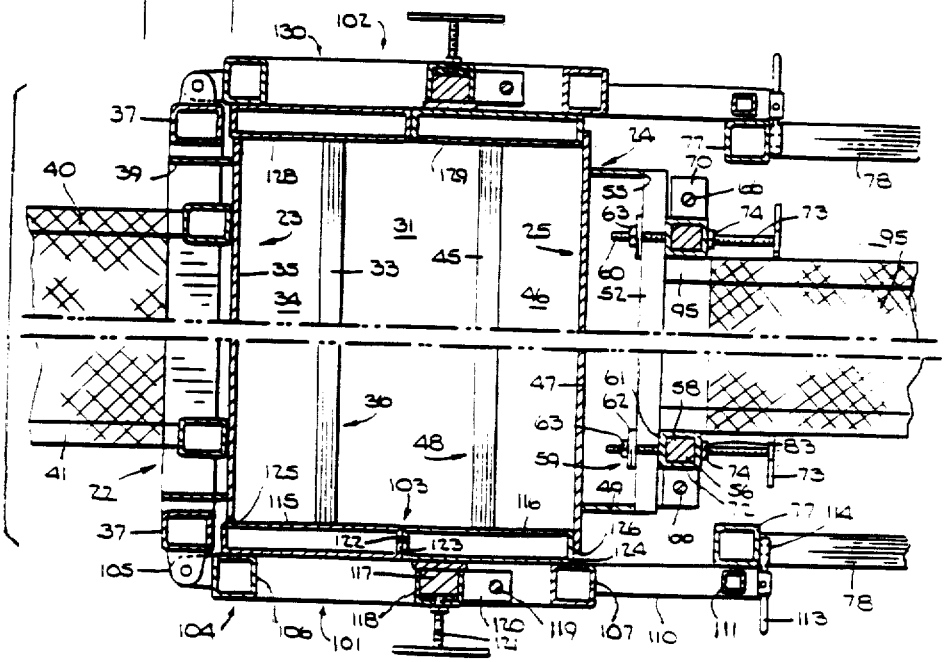
FIG. 5 is a partial plan view, in section, taken along the line 5—5 in FIG. 8, of the adjustable mold apparatus of FIG. 4.
Figures 2, 3, 4:
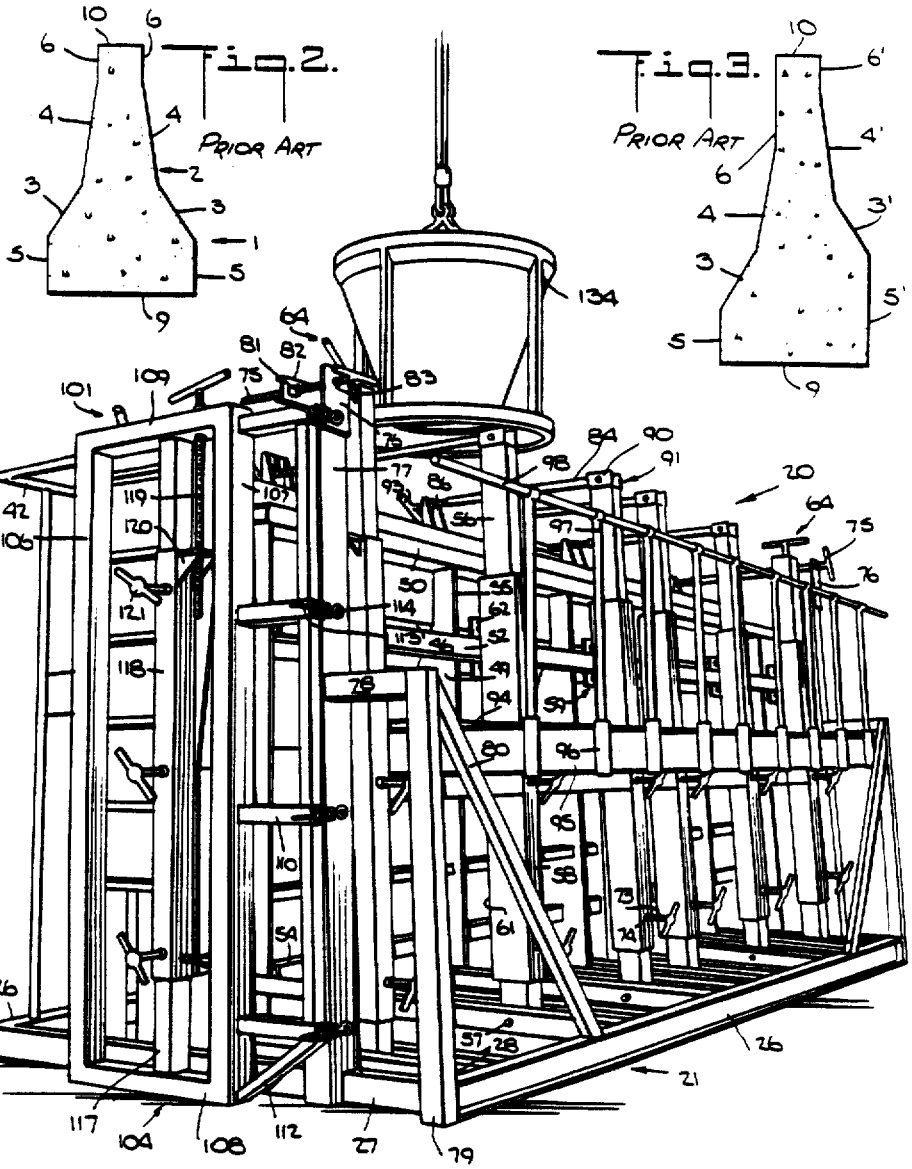
Fig. 2. PRIOR ART
Fig. 3. PRIOR ART
FIG. 2 is a cross-sectional view of a conventional symmetric barrier.
FIG. 3 is a cross-sectional view of a conventional asymmetric barrier.
FIG. 4 is a perspective view of an adjustable mold apparatus for casting asymmetric concrete highway barriers.
Figure 7:
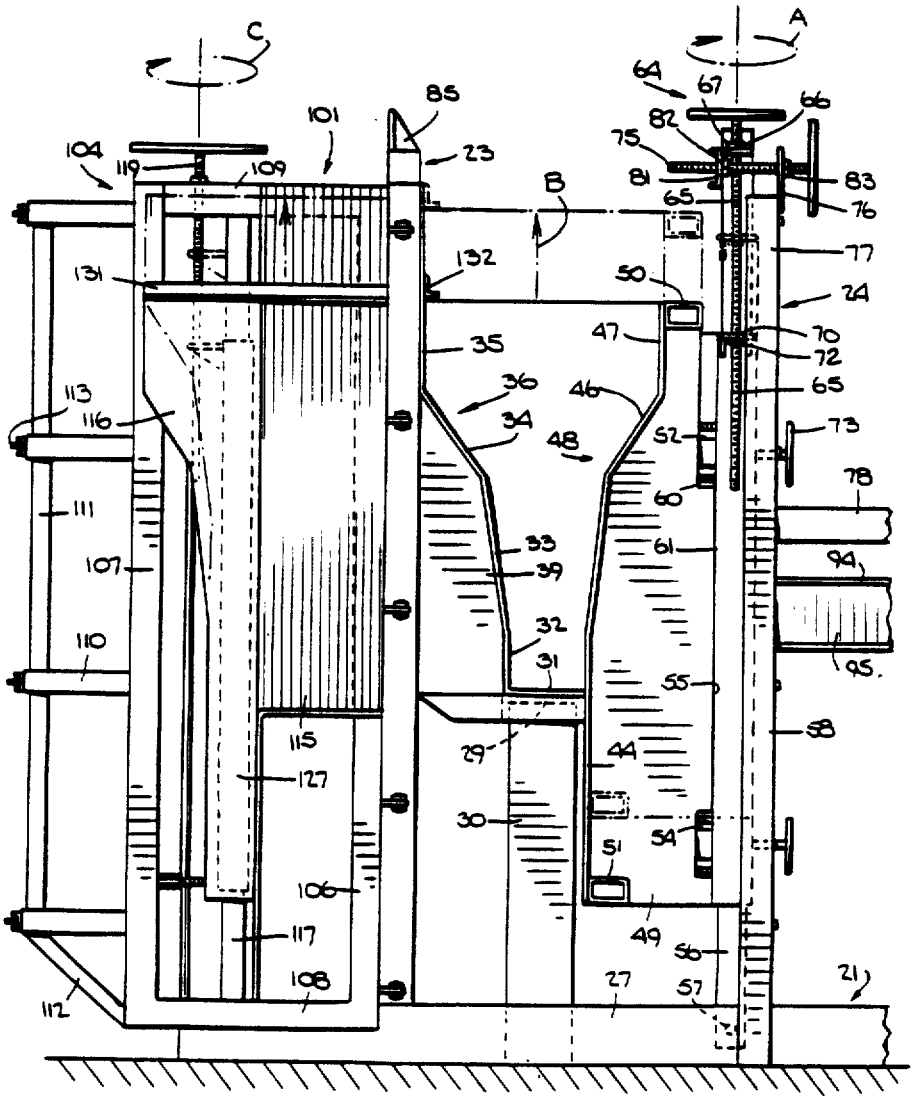
FIG. 7 is an end elevation view showing the adjustable mold apparatus of FIG. 4 with the end door of the mold open and illustrating the vertical adjustment capability of the mold.
Figure 8:
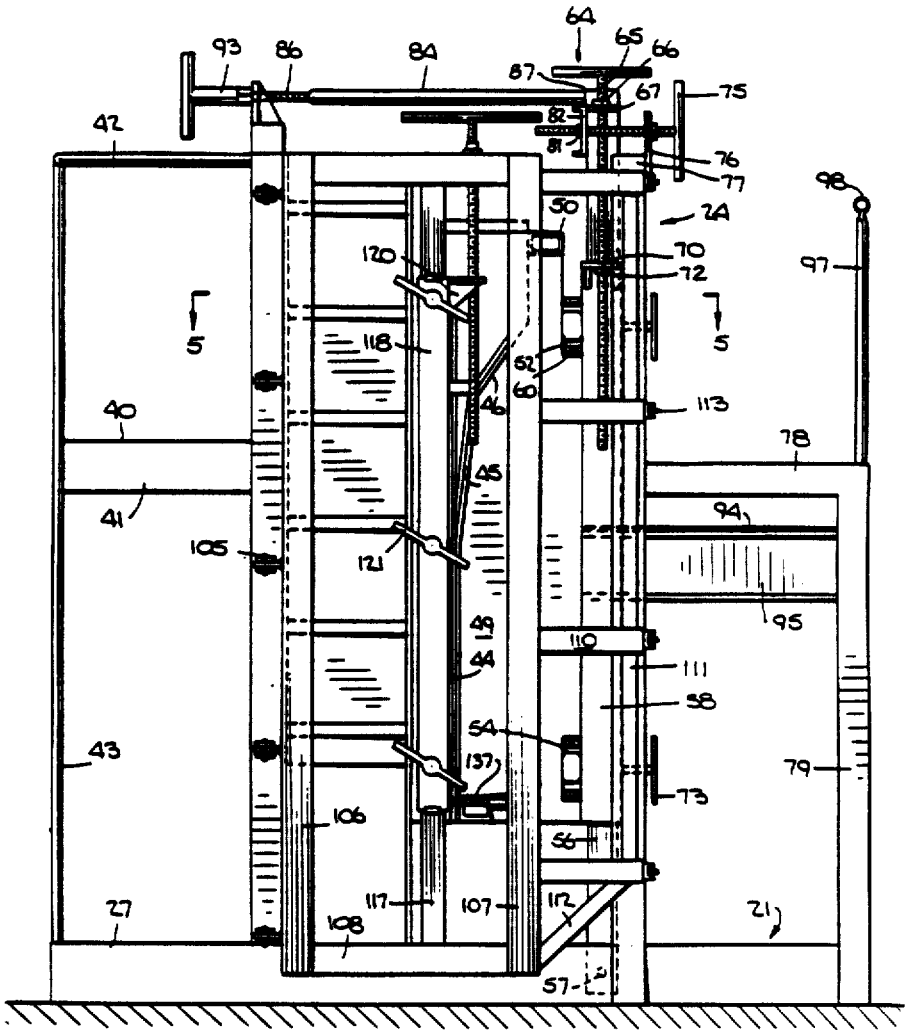
FIG. 8 is an end elevation view of the mold apparatus similar to FIG. 7 but showing the end door shut.

As shown most clearly by FIGS. 5 and 7, the first and second panel sections 115 and 116 have slidably abutting side edges 122 and 123 that contact each other on a vertical plane which is parallel to, and preferably contains, the longitudinal center-line of the mold. The outer side edge 124 of the adjustable second panel section 116 has a profile that mates with the profile of the inner surface of the second side wall of the mold. As mentioned previously, the first end panel section is rectangular, and it is sized to overlap the end edge of the stationary first side wall of the mold as well as part of the end edge of the bottom plate of the mold. The hinges 105 are located relative to the end edge 125 of the stationary part of the mold so that the inner face of first end panel section 115 abuts against the end edges of the stationary side wall plates 32–35 and the base plate 31 in sealing engagement therewith when the door frame 104 is latched shut.

The end edge 126 of the adjustable second side wall 48 of the mold extends beyond the plane of the end edge of the stationary part of the mold (see FIG. 5) so that the end of the second side wall overlaps the mating outer edge 124 of the second panel section 116. In this way, the profiled side edge 124 of the second panel section seals against the inner surface of the second side wall 48 of the mold, while the face of the lower tail portion 127 (see FIG. 7) of the second panel section sealing abuts against the opposing portion of the end edge of the base plate 31 of the mold.

The construction and operation of the second end closure 102 is identical to that of the first end closure 101 except that the first and second end panel sections 128 and 129 and the door frame 130 of the second closure are mirror images of first and second end panel sections 115 and 116 and door frame 104, respectively, of the first end closure 101.

The procedure for setting up the mold, casting a concrete median barrier, and removing the barrier from the mold after curing will be described next, with particular reference to FIGS. 6, 7, and 9–13.

First, the end doors are opened and all the tie rods 84 are loosened so that the second end panel sections 116 and 129 of the two end panels can be adjusted by rotation of the corresponding jack screws 119, as indicated by arrow C in FIG. 7, and the adjustable side wall 48 can be freely raised or lowered on the pivoted support posts 56 by rotation of the screw jacks 64 at each end of the mold, as indicated by the arrow A in FIG. 7. The height of the top of the second end panel of the respective door at each end of the mold then will be adjusted in accordance with predetermined difference in grade level between the roadway lanes adjacent to the two sides of the particular median barrier to be cast. This difference in grade level may change from one end of the barrier section to the other, so that the two second end panels may be set at different heights relative to the tops of the fixed end panels. After adjustment, the end doors are then shut and locked by the T-handled clamping screws 121, after first making sure that the adjustable side wall 48 is lowered sufficiently to avoid interfering with the second end panels.

The top of adjustable side wall 48 (i.e., the upper surface of box beam 50) defines the base of the barrier, since the mold is inverted. The purpose of the inversion is to locate the widest cross dimension at the top of the mold. This permits better access to the concrete as it is being poured to insure that no pockets or voids are created and produces a smoother, more dense surface. The vertical dimension of the topmost side plate surface 47 of adjustable side wall 48 is equal to the predetermined distance from the foundation for the barrier to a level three inches above the finished surface of the adjacent roadway. The vertical dimension of the corresponding topmost plate surface 35 of the stationary side wall 36 is greater than the vertical dimension of plate surface 47 by an amount equal to the preselected vertical adjustment capacity of the mold, which may be two feet, to accommodate the maximum expected grade level difference between adjacent roadways.

It will be noted that the vertical dimension of the lowermost side plate surface 44 of adjustable side wall 48 exceeds the vertical dimension of lowermost side plate surface 32 of stationary side wall 36 by an equivalent amount, again to accommodate the range of vertical adjustment provided by the mold assembly.

Next, each end of the adjustable side wall is raised by the respective screw jack until the ends fit snugly against the respective second end panels of the end doors. After the height of each end of the adjustable side wall 48 has been set appropriately, the wall can be locked to the posts 56 by the clamping screws 73.

Fastened to the top of each of the second end panel sections is a horizontal angle bar 131. This bar also extends across the face of the adjacent one of the fixed panel sections 115 and 128 but is not fastened to the fixed section. Thus, the angle bar 131 rises up and down with the second end panel section 116 and 129. The top of the adjustable side wall 48 will be set level with the base of the angle bar, and this base serves as a shelf or rest for an elongated screed rail 132, made of aluminum angle stock. A short screed is then used to even off the surface of the poured concrete to provide a flat base for the finished barrier.

After the movable side wall is finally adjusted, the tie rods 84 are installed and tightened to bring the movable side wall 48 into sealing contact with the edges of the base plate 31 and the second end panel sections 116 and 129. As shown in FIG. 9, reinforcing bars 133 are next positioned in the mold, and premixed concrete is poured into the mold from a bucket 134. The concrete in the mold is vibrated during pouring to eliminate air pockets, as is well known, and the top of the concrete is finished off by moving a screed across the mold on the angle bars 132 and the top of side wall 48, as previously described.

Figure 10:
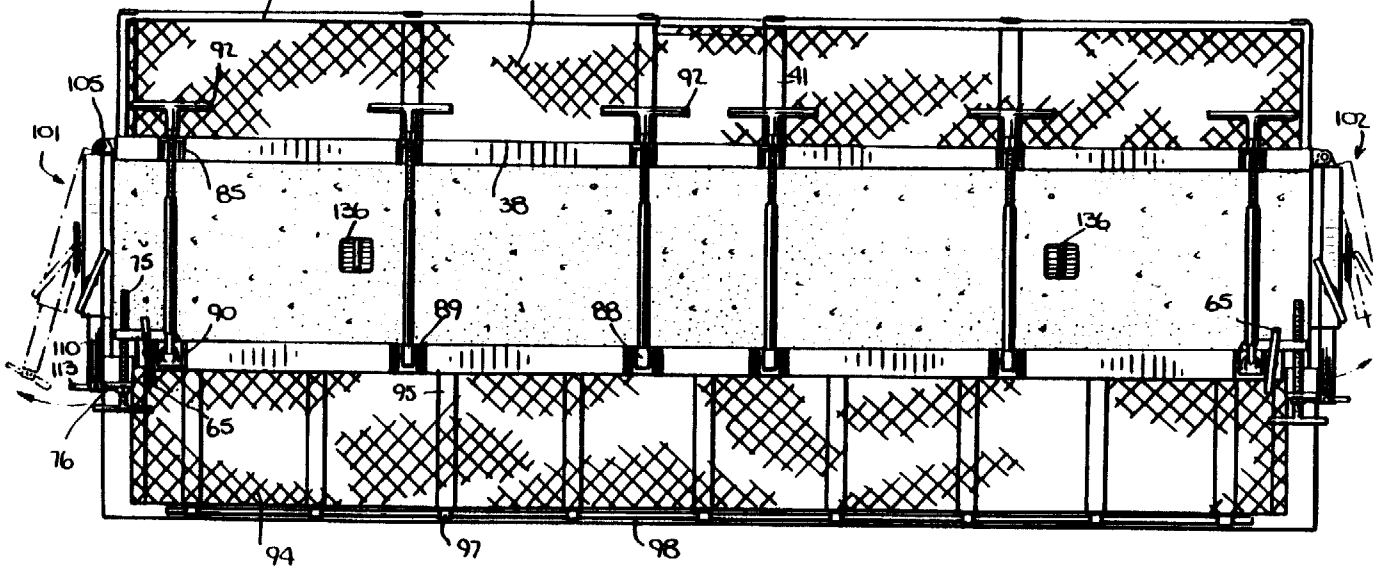
FIG. 10 is a plane view of the adjustable mold apparatus of FIG. 4.
Figure 11:
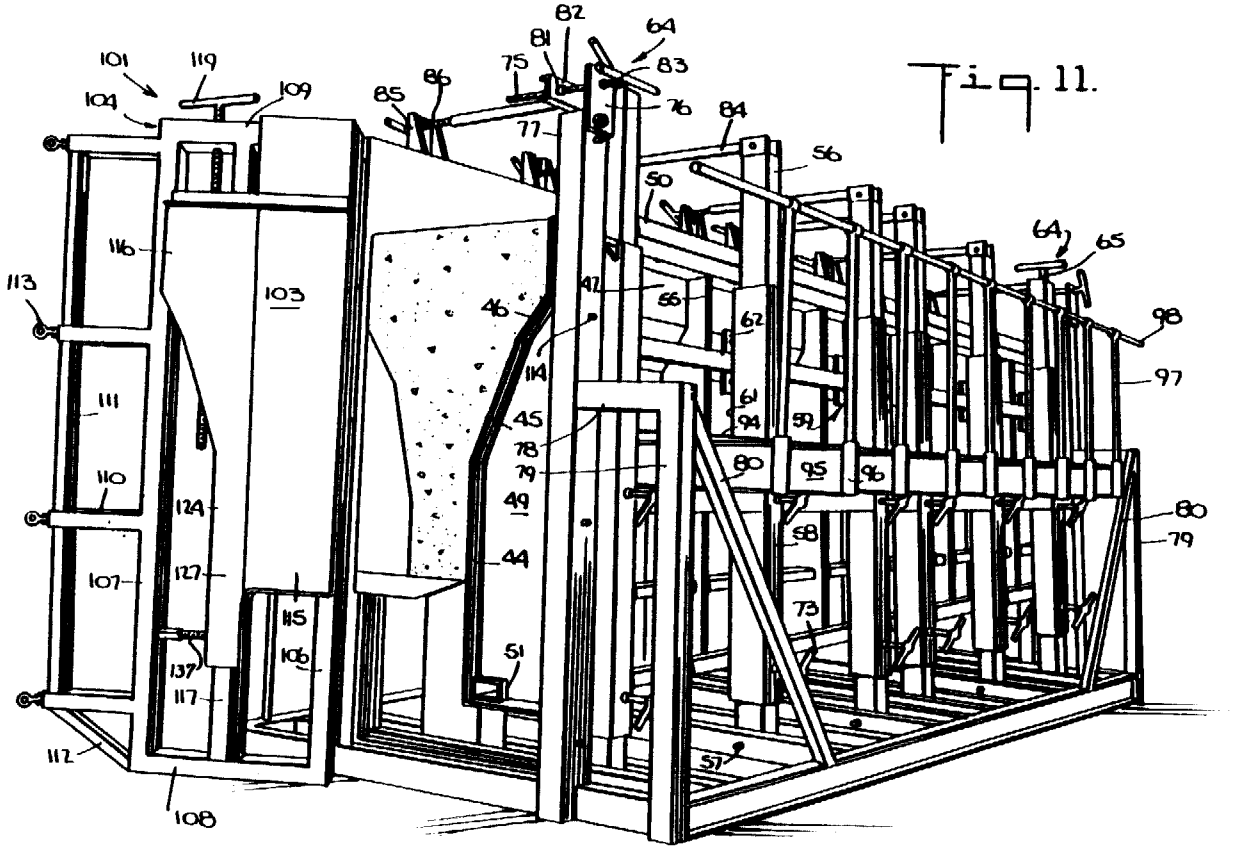
FIG. 11 is a perspective view similar to FIG. 4 showing the adjustable mold apparatus with the end door opened prior to removing a cured concrete barrier from the mold.
Figure 13:
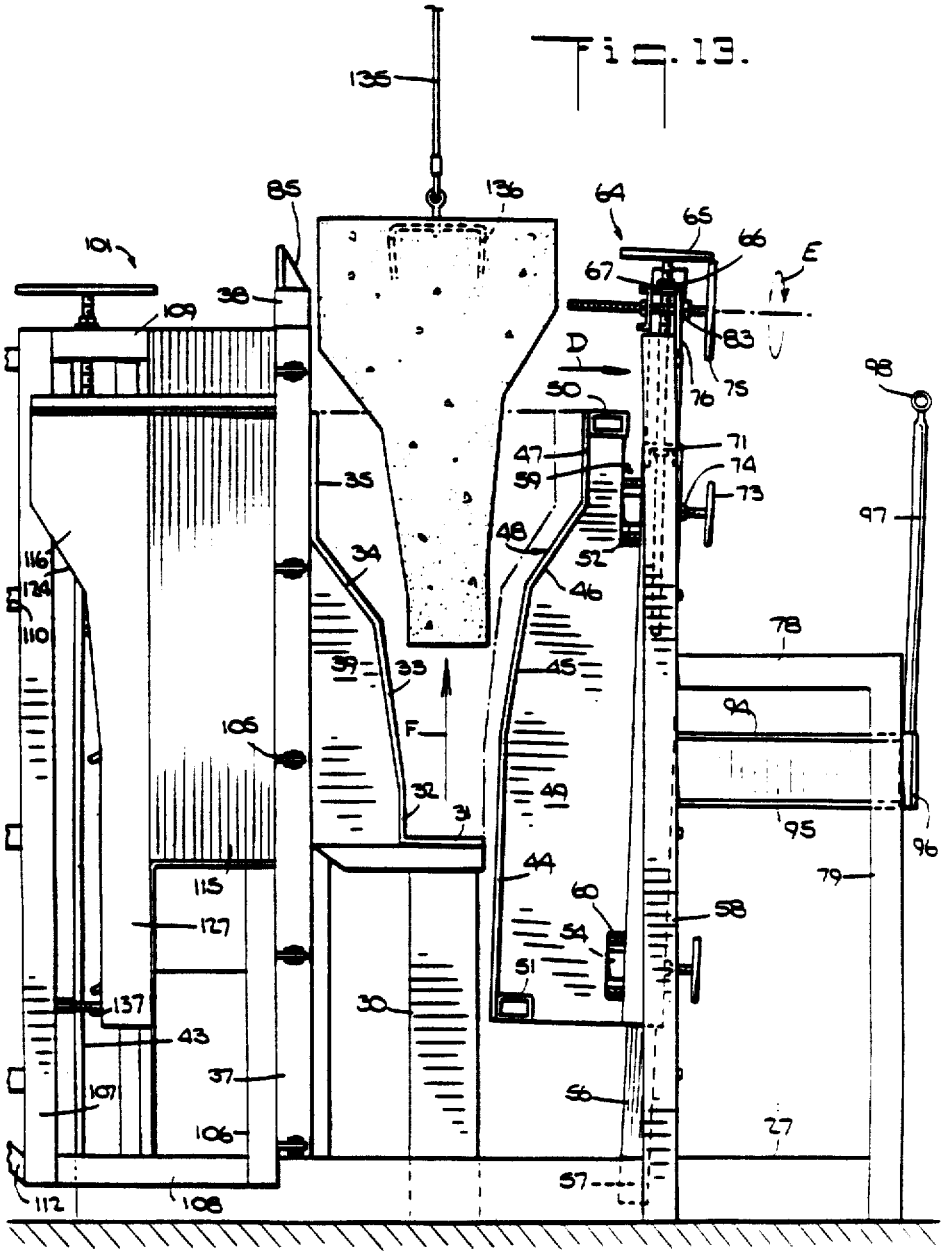
FIG. 13 is an end elevation view similar to FIG. 10 but showing the adjustable side wall swung away and the cured concrete barrier being lifted out of the mold.

With reference to FIG. 13, following an appropriate time for curing, the movable side wall 48 of the mold is then drawn away from the casting, in the direction of arrow D, by rotating the T-handled screws 75, as shown by the arrow E. Then the end doors are unlatched and swung open, as indicated in FIGS. 10 and 11. Next, lifting lines 135 (set FIG. 12) are hooked to lifting inserts 136 that were placed in the concrete before it set, and a slight strain is taken on the lines. The casting can then be lifted from the mold, in the direction of arrow F, without requiring excessive force to pull the concrete away from the side walls of the mold.

From the foregoing description, it will be apparent that the adjustable mold of the present invention permits easy and rapid set up for casting either symmetric or asymmetric barriers and having a range of adjustment capable of meeting any requirement. The mold is rugged enough to have an almost indefinite service life with maintaining the cast products within close dimensional tolerances.

As previously pointed out, the split end panel arrangement is a key feature of the mold that allows a full range of height and tilt adjustment for the movable side wall of the mold while still assuring leak tight sealing at the ends of the mold without the need for any extraneous gaskets or filler. In this connection, the tightness of the interface between the two panel sections at each end can be augmented by means of a threaded stud 137 that extends laterally from the lower portion of the vertical sleeve 118 (see FIG. 11). A cylindrical nut 138 threaded onto the stud can be screwed out to bear against the vertical edge of member 107 of the door frame and thus close any gap that may exist between the two panel sections. To prevent cement paste from entering the joint between the panel sections, it is covered with masking tape before each pour.

Although the preferred embodiment of the invention has been shown and described, it will be appreciated that various other arrangements are possible within the scope of the invention. In particular, many alternative support structures can be used to provide strength and rigidity without adversely affecting the adjustability of the system. Also, the simple and inexpensive manually operated screw jacks used as the adjusting means could be replaced by electrically or hydraulically actuated devices. Additionally, the end closures can be mounted otherwise than on hinges for rotation about a vertical axis. For example, the door frames could be pivotally supported like the movable side wall for rotation about a horizontal axis. Alternatively, either or both of the movable side wall and the end closures could be supported on rails or other means for horizontal translation toward and away from the stationary parts of the mold. Many other modifications are also possible within the scope of the appended claims, which define the invention.

It is possible, in addition, to change the mold so that the barrier section is poured right side up instead of upside down, but it is more difficult to pour and vibrate the concrete to assure no voids and a smooth surface finish. Further, the movable side wall could be adjusted before the second end panels of the doors, but each second end panel has an adjacent fixed panel that makes adjustment a matter of a single quick and accurate measurement. Further, the finished casting does not have to be lifted completely clear of the mold but can be slipped out of one end after being lifted away from contact with the bottom and fixed sidewall.

Finally, the stationary sidewall may also be mounted on hinged vertical supports and be separate from the base plate, if desired, to make it even easier to remove the cured casting from the mold. That is particularly advantageous if the mold sides are provided with an embossed surface to give a textured effect to the barrier wall.

I claim:

1. An adjustable mold for an elongated rectilinear concrete member, the mold comprising:

a stationary portion including an elongated horizontal base wall and a first upright side wall, the base wall having first and second longitudinal edges extending between a first end and a second end of the base wall, and the first side wall having a first end and a second end;

means for supporting the first side wall contiguous to the first longitudinal edge of the base wall with the first and second ends of the first side wall being adjacent to the respective first and second ends of the base wall;

a movable portion including an elongated second side wall having a first end, a second end, and a transverse profile having nonvertical portions;

means for mounting the second side wall upright and in abutting engagement with the second longitudinal edge of the base wall, the first end of the second side wall being adjacent to the first end of the base wall and the second end of the second side wall being adjacent to the second end of the base wall;

means for independently adjusting the heights of the first end and the second end of the second side wall with respect to the base wall;

first and second end walls, each end wall being formed with a first panel section and a second panel section;

means for adjusting the position of the second panel section relative to the first panel section of each end wall; and means for supporting the first and second end walls relative to the respective first and second ends of the mold such that the first panel sections sealably engage the corresponding ends of the base wall and the first side wall, and the second panel sections are adjustable to sealably engage the corresponding ends of the second side wall.

2. An adjustable mold according to claim 1 wherein the means for mounting the second side wall comprises means for moving the second side wall toward and away from the second longitudinal edge of the base wall.

3. An adjustable mold according to claim 1 wherein the means for mounting the second side wall comprises:

a first upright post located adjacent to the first end of the second side wall;

a second upright post located adjacent to the second end of the second side wall;

means for hingedly supporting the lower end of each post to permit limited rotation of the post toward and away from the second longitudinal edge of the base wall; and means for slidably coupling the second side wall to the first and second upright posts.

4. An adjustable mold according to claim 3 wherein the means for independently adjusting the heights of the first end and the second end of the second side wall with respect to the base wall comprise:

first jack means connected between the first upright post and the means for slidably coupling the second side wall to the first upright post; and second jack means connected between the second upright post and the means for slidably coupling the second side wall to the second upright post.

5. An adjustable mold according to claim 4 wherein said first and second jack means comprise screw jacks.

6. An adjustable mold according to claim 1 wherein each of the means for supporting the first and second end walls comprises:

an upright frame, the first panel section of the respective end wall having a straight edge and being fixed to the frame such that said straight edge coincides with a vertical plane that intersects the base wall of the mold when the first panel section sealably engages the corresponding ends of the base wall and the first side wall, and the second panel section having a first side with a straight edge and a second side, opposite the first side, with an edge conforming to the transverse profile of the second side wall;

means for hingedly mounting the frame on the stationary portion of the mold;

means for slidably coupling the second panel section for vertical translation with the straight edge of the first side of the second panel section abutting the straight edge of the first panel section; and means for adjusting the height of the second panel section with respect to the frame so that the second side of the second panel section mates with the profile of the second side wall of the mold.

7. An adjustable mold according to claim 6 wherein the means for hingedly mounting the frame on the stationary portion of the mold comprises means for rotating the frame about a vertical axis adjacent to the corresponding end of the first side wall.

8. An adjustable mold according to claim 6 wherein the first and second ends of the first side wall lie in respective common planes with the first and second ends of the base wall, and the first panel sections of the respective end walls have faces that sealably engage the corresponding ends of the base wall and the first side wall in the respective common planes, and wherein the first and second ends of the second side wall extend beyond said respective common planes for mating with the edges of the second sides of the respective panel sections.

9. An adjustable mold according to claim 1 wherein the nonvertical portions of the second side wall slope upwardly away from the first side wall so that the cross dimension of the mold increases with increasing distance above the base wall.

10. A method of forming an asymmetrical concrete barrier section for separating highway surfaces of predetermined different elevations and grades, the barrier section including oppositely disposed side walls having surfaces that extend obliquely upward and inward from a base portion to a top surface narrower than the base portion, with the oblique side wall surfaces on each side arranged to be disposed at predetermined equal heights above the respective adjacent highway surface, wherein the method comprises:

providing an elongated mold having a stationary first side wall including an oblique surface portion for forming the corresponding oblique surface of one side wall of the barrier and a stationary bottom wall; an adjustable second side wall including an oblique surface portion for forming the corresponding oblique surface of the other side wall of the barrier; and two end walls, each end wall being vertically split into a fixed height section and an adjustable height section and each adjustable height section having an oblique outer side edge matable with the oblique surface portion of the second side wall;

adjusting the height of the adjustable height section of each end wall to a predetermined value relative to the height of the fixed height section corresponding to the predetermined difference in elevation of the separated highway surfaces at the respective ends of the barrier section;

placing each end wall so that the fixed height section is in sealing engagement with the bottom wall of the mold;

placing the second side wall into sealing contact with the bottom wall of the form;

adjusting the height of one end of the oblique surface portion of the second side wall of the mold to mate with the adjacent edge of the adjustable height section of the respective end wall;

adjusting the height of the opposite end of the oblique surface portion of the second side wall to make with the adjacent edge of the adjustable height section of the respective end wall;

pouring a concrete mixture into the form to a predetermined level above the oblique surfaces of the side walls; and removing the poured barrier from the mold after the concrete has set.

11. A method according to claim 10, the method further comprising:

disposing the second sidewall close to but not in contact with the bottom wall of the mold prior to adjusting the height of the adjustable height section of each end wall to provide clearance for adjusting said sections.

12. A method according to claim 10 wherein the step of removing the cured concrete barrier from the mold comprises:

moving the second side wall away from contact-with the bottom wall of the mold;

moving the end walls away from contact with the corresponding ends of the first side wall and of the bottom wall; and lifting the cured concrete barrier from the end.

*13. An adjustable mold for an elongated rectilinear concrete member, the mold comprising:*

*a first portion including a first upright side wall having a first end and a second end;*

*an elongated horizontal base wall having first and second longitudinal edges extending between a first end and a second end of the base wall;*

*means for supporting the first side wall contiguous to the first longitudinal edge of the base wall with the first and second ends of the first side wall being adjacent to the respective first and second ends of the base wall;*

*a second portion vertically movable with respect to the first portion and including an elongated second side wall having a first end, a second end, and a transverse profile having nonvertical portions;*

*means for mounting the second side wall upright and in abutting engagement with the second longitudinal edge of the base wall, the first end of the second side wall being adjacent to the first end of the base wall and the second end of the second side wall being adjacent to the second end of the base wall;*

*means for independently adjusting the heights of the first end and the second end of the second side wall with respect to the heights of the first end and the second end of the first side wall;*

*first and second end walls, each end wall having a side edge profiled to mate with the nonvertical portions of the second side wall;*

*means for adjusting the height of the profiled edge of each end wall to match the height of the second side wall; and*

*means for supporting the first and second end walls relative to the respective first and second ends of the mold such that the end walls sealably engage the*

*corresponding ends of the base wall and the first side wall, and the profiled side edges of the end walls are adjustable to sealably engage the transverse profile of the second side wall.*

*14. A method of forming an asymmetrical concrete barrier section for separating highway surfaces of predetermined different elevations and grades, the barrier section including oppositely disposed side walls having surfaces that extend obliquely upward and inward from a base portion to a top surface narrower than the base portion, with the oblique side wall surfaces on each side arranged to be disposed at predetermined equal heights above the respective adjacent highway surface, wherein the method comprises:*

*providing an elongated mold having a first side wall including an oblique surface portion forming the corresponding oblique surface of one side wall of the barrier and a bottom wall; a second side wall adjustable with respect to the first side wall and including an oblique surface portion for forming the corresponding oblique surface of the other side wall of the barrier; and two end walls, each end wall having an oblique outer side edge matable with the oblique surface portion of the second side wall;*

*adjusting the height of the oblique outer side edge of each end wall to a predetermined value relative to the height of the oblique surface of the first side wall corresponding to the predetermined difference in elevation of the separated highway surfaces at the respective ends of the barrier section;*

*placing each end wall so that the end wall is in sealing engagement with the bottom wall of the mold;*

*placing the second side wall into sealing contact with the bottom wall of the mold;*

*adjusting the height of one end of the oblique surface portion of the second side wall of the mold to mate with the adjacent oblique edge of the respective end wall;*

*adjusting the height of the opposite end of the oblique surface portion of the second side wall to mate with the adjacent oblique edge of the respective end wall;*

*pouring a concrete mixture into the form to a predetermined level above the oblique surfaces of the side walls; and*

*removing the poured barrier from the mold after the concrete has set.*

* * * * *

UNITED STATES PATENT AND TRADEMARK OFFICE

CERTIFICATE OF CORRECTION

PATENT NO. : RE 32,936

DATED : May 30, 1989

INVENTOR(S) : Peter Smith

It is certified that error appears in the above-identified patent and that said Letters Patent is hereby corrected as shown below:

Title page:

Abstract, line 5: "old" should be --mold--.

Col. 2, line 17: "mediam" should be --median--.

Col. 2, line 30: "section" should be --sections--.

Col. 5, line 5: "nu" should be --nut--.

Col. 9, line 7: "with" should be --while--.

Col. 12, line 11: "make" should be --mate--.

Signed and Sealed this

Fifteenth Day of May, 1990

*Attest:*

*Attesting Officer*

HARRY F. MANBECK, JR.

*Commissioner of Patents and Trademarks*